United States Patent
Goodall et al.

(10) Patent No.: US 8,713,190 B1
(45) Date of Patent: Apr. 29, 2014

(54) METHOD AND APPARATUS FOR PERFORMING REAL TIME ANOMALY DETECTION

(75) Inventors: Colin Goodall, Rumson, NJ (US); William H. DuMouchel, Tucson, AZ (US); Deepak Agarwal, San Jose, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1645 days.

(21) Appl. No.: 11/518,291

(22) Filed: Sep. 8, 2006

(51) Int. Cl.
*G06F 15/16* (2006.01)

(52) U.S. Cl.
USPC .......................................................... 709/231

(58) Field of Classification Search
USPC .......................................................... 709/231
See application file for complete search history.

(56) References Cited

U.S. PATENT DOCUMENTS

| | | | |
|---|---|---|---|
| 4,196,445 A * | 4/1980 | Okada et al. ................... | 348/499 |
| 5,958,009 A * | 9/1999 | Friedrich et al. ............... | 709/224 |
| 6,317,700 B1 * | 11/2001 | Bagne ............................ | 702/181 |
| 6,839,751 B1 * | 1/2005 | Dietz et al. ..................... | 709/224 |
| 6,958,951 B2 * | 10/2005 | Duven ............................ | 368/10 |
| 2001/0011245 A1 * | 8/2001 | Duhon ........................... | 705/38 |
| 2001/0018659 A1 * | 8/2001 | Koritzinsky et al. ............. | 705/3 |
| 2001/0034795 A1 * | 10/2001 | Moulton et al. ............... | 709/244 |
| 2003/0027223 A1 * | 2/2003 | Muraca ......................... | 435/7.21 |
| 2004/0128267 A1 * | 7/2004 | Berger et al. ..................... | 707/1 |
| 2004/0193451 A1 * | 9/2004 | McNair ............................. | 705/2 |
| 2004/0260584 A1 * | 12/2004 | Terasawa .......................... | 705/7 |
| 2005/0024157 A1 * | 2/2005 | Duven ............................. | 331/46 |
| 2005/0249341 A1 * | 11/2005 | Mahone et al. .......... | 379/114.14 |
| 2006/0053123 A1 * | 3/2006 | Ide et al. ....................... | 707/100 |
| 2007/0078606 A1 * | 4/2007 | Cherepinsky et al. .......... | 702/20 |
| 2007/0219885 A1 * | 9/2007 | Banasiak et al. ................ | 705/35 |
| 2007/0291842 A1 * | 12/2007 | Au et al. ................... | 375/240.15 |

* cited by examiner

*Primary Examiner* — Azizul Choudhury
*Assistant Examiner* — Tariq Najee-Ullah (57) ABSTRACT

A method and apparatus for anomaly detection in a data stream are disclosed. In one embodiment, the present method detects an anomalous condition in a data stream, by calculating at least one expected base event count for at least one event in the data stream for a time interval, obtaining an actual event count for the at least one event in the data stream, applying at least one shrinkage factor to the at least one expected base event count to obtain at least one actual estimated event count and detecting the anomalous condition in accordance with the actual event count and the at least one actual estimated event count.

11 Claims, 3 Drawing Sheets

FIG. 3 a# METHOD AND APPARATUS FOR PERFORMING REAL TIME ANOMALY DETECTION

The present invention relates generally to traffic monitoring and, more particularly, to a method and apparatus for identifying traffic anomalies for monitoring networks, e.g., packet communication networks such as Voice over Internet Protocol (VoIP) or Service over Internet Protocol (SoIP) networks.

BACKGROUND OF THE INVENTION

The Internet has emerged as a critical communication infrastructure, carrying traffic for a wide range of important scientific, business and consumer applications. Network service providers and enterprise network operators need the ability to detect anomalous events in the network, e.g., for performing network management and monitoring functions, reliability analysis, security and performance evaluations, and the like. While some traffic anomalies are relatively benign and tolerable, others can be symptomatic of potentially serious problems such as performance bottlenecks due to network element failures, malicious activities such as denial of service attacks (DoS), and worm propagation. It is therefore very important to be able to detect traffic anomalies accurately and in near real-time, to enable timely initiation of appropriate mitigation steps.

An important property of effective anomaly detection is to be able to characterize, and therefore to isolate, the anomaly. For network service providers and enterprise network operators, characterization might be by through identifying one or more routers, one or more originating internet protocol (IP) addresses, one or more terminating IP addresses, packet type, and other characteristics taken from the packet header and packet payload.

One of the main challenges of detecting anomalies is the mere volume of traffic and measured statistics. For example, in a system that gathers data in a regular interval to obtain the events that are the basis of the anomalies, the events can impact multiple categories or classifications. The system needs to determine whether the current data is anomalous relative to historical pattern and current overall statistics for all the categories in real time or near real time and initiate mitigation steps. Given today's traffic volume and link speeds, the input data stream can easily contain millions or more of concurrent flows, so it is often impossible or too expensive to maintain the entire previously collected data stream. Methods designed for static analysis require adjusting the parameters used for estimation based on the entire collected data and are prohibitive.

Therefore, a need exists for a method and apparatus for near real-time detection of anomalies in streaming cross-classified event data for networks, e.g., data, streaming media, VoIP or SoIP networks.

SUMMARY OF THE INVENTION

In one embodiment, the present invention discloses a method and apparatus for detecting anomalies from massive data streams with a large number of flows in real time. In one embodiment, the complexities of the dynamic setting are offset by simplification of the model without sacrificing the essential features of applicability for massive scale and shrinkage. For example, the present method detects an anomalous condition in a data stream, by calculating at least one expected base event count for at least one event in the data stream for a time interval, obtaining an actual event count for the at least one event in the data stream, applying at least one shrinkage factor to the at least one expected base event count to obtain at least one actual estimated event count and detecting the anomalous condition in accordance with the actual event count and the at least one actual estimated event count. Thus, the present method is able to retain the statistical significance of the previous data, but requires less computation than methods that need the entire set of collected data.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for detecting anomalies in massive data streams, e.g., data with cross-classified events. A cross-classified event is an event that can be classified according to the categories, sometimes also called levels, outcomes, or classes in common statistical usage, of one or more classification variables, sometimes also called factors or variables. For example, a telephone call can be classified by a factor call status with categories "successful", "unsuccessful—network congestion", "unsuccessful—the hardware failure" or "unsuccessful—incorrect call information", "unsuccessful—any other reason" and so on. Although the present invention is discussed below in the context of detecting traffic anomalies in a communication network, the present invention is not so limited. Namely, the present invention can be applied in the context of datamining, trending, forecasting, outlier detection and the like. For example, the present invention can be applied to detect anomalous events in the context of biosurveillance, e.g., an unusual high number of flu related illnesses, an unusual high number of reported cases of pneumonia, an unusual high number of a particular type of physical injury, and the like. Similarly, the present invention can be used in the context of combinatorial chemistry or drug discovery, e.g., for detecting an unusual number of incidents of a particular side effect, an unusual number of reactions, and the like. Similarly, the present invention can be used in the context of financial market evaluation, e.g., for detecting an unusual number of transactions, an unusual number of trades, an unusual number of purchases, and the like. Furthermore, although the present invention is discussed below in the context of packets, the present invention is not so limited. Namely, the present invention can be applied in the context of records, fields, or any other unit or measure of data. For the purpose of scope, the term packet is intended to broadly include a record or a field, e.g., medical records, financial records, chemical reaction records, and the like.

The present invention can be applied to detect unusual numbers of events classified using two or more classification variables simultaneously. Categories taken from each of the respective variables define a composite, or cross-classified category, e.g. telephone call failure to complete due to non-existent terminating telephone number (category for variable 1), for dialed telephone numbers with area code 305 (category 2), and originating from telephone exchanges with exchange 212-760 (category 3). The present invention can be applied to detect anomalous events in the context of biosurveillance with multiple classification variables, e.g., an unusual high number of flu related illnesses (category for variable 1), in 5-digit ZIP region 07701 (category 2). This illustrative two-variable cross-classification category can be further refined to three or more classification variables, e.g. flu-like (category 1) in ZIP5 07701 (category 2) amongst the 65+ years retirement age population (category 3) that are female (category 4) and have sought treatment at the local hospital, Riverview Medical Center (category 5).

The method and apparatus to detect anomalies in massive data streams comprising data with cross-classified events operates against all categories of each factor in parallel—parallel in the sense of the matrix computations of linear algebra, and optionally also in a parallel computational mode. The operation depends on the cardinality, or number of categories, of each classification variable, e.g., for the variables cited above and others, these are approximately call status—5 categories, medical condition—3 listed, medical syndrome—10, medical syndrome/sub syndrome—70, area codes/NPAs in North American Numbering Plan—900, telephone exchanges (US)—450000, ZIP5—5000, ZIP3—300, age groups—10, gender—4 (M/F/transgender/Unk), hospitals (US)—4000, hospitals (NJ)—60. Additionally, the allowed categories might include subsets of each of these categories. For operation of the invention, the total number of cross-classified categories is significant; e.g. for the 5-variable biosurveillance example, this total is 3×5000×10×4×60=36,000,000.

The present invention discloses a method and apparatus for detecting anomalies in cross-classified data streams pursuant to certain conditions and relationships among the variables. These are listed in the following. The first item on the list is intrinsic to the method; the second and subsequent items illustrate the scope of the method. (Item 1.) The events are cross-classified into bins at specified time intervals, e.g. 1 minute, 1 hour, 1 day; there is a single bin for each time interval and combination of categories. (Item 2.) The method can be adapted to detect unusually low counts as well as unusually high counts in a bin. (Item 3.) The method may be applied multiple times to the same cross-classified data stream, for each classification variable single, for each pair of factors, and so forth up to all factors simultaneously which is the full cross-classification. (Item 4.) The categories of each classification variable can be, but need not be, mutually exclusive, e.g. the categories of a single ZIP-based classification variable can include both 5-digit and 3-digit ZIP codes. The method allows arbitrary combinations of categories to make new categories. (Item 5.) The method and apparatus can incorporate additional variables, known as covariates, which are not classification variables per se but are variables information from which is included in anomaly detection; a covariate can be both categorical, e.g. age group, or continuous, e.g. age defined as number of days since date of birth. (Item 6.) The method and apparatus can incorporate information about historical or inferred patterns in the relationship between categories; e.g. an unusual high count at a specific ZIP5 region is considered more unusual if the count is high at other neighboring ZIP5 regions, or an unusual high count for packets from a specific set of IP addresses known for launching DoS attacks is considered less unusual if the count is low for packets from other sets of IP addresses known for launching DoS attacks in concert with the specific set. (Item 7.) The method and apparatus allow for nesting of classification variables, e.g. a classification variable with categories the states of the US, and for each state, a classification variable with categories the counties within the state. (Item 8.) The method and apparatus allow for combination of two or more classification variables into a single classification variable with set of categories equal to combinations of categories from the respective sets of categories of the initial classification variables. (Item 9.) The method and apparatus allow for collapsing of two or more categories to make a new category, and for removal of any category from the set of categories; when the set of categories is not exhaustive of all possible values seen in the data, then there may be some events that are dropped from the analysis, and the original data stream is filtered to a smaller stream, e.g. excluding every packet with originating IP address inside the att.com domain.

Figure 1:
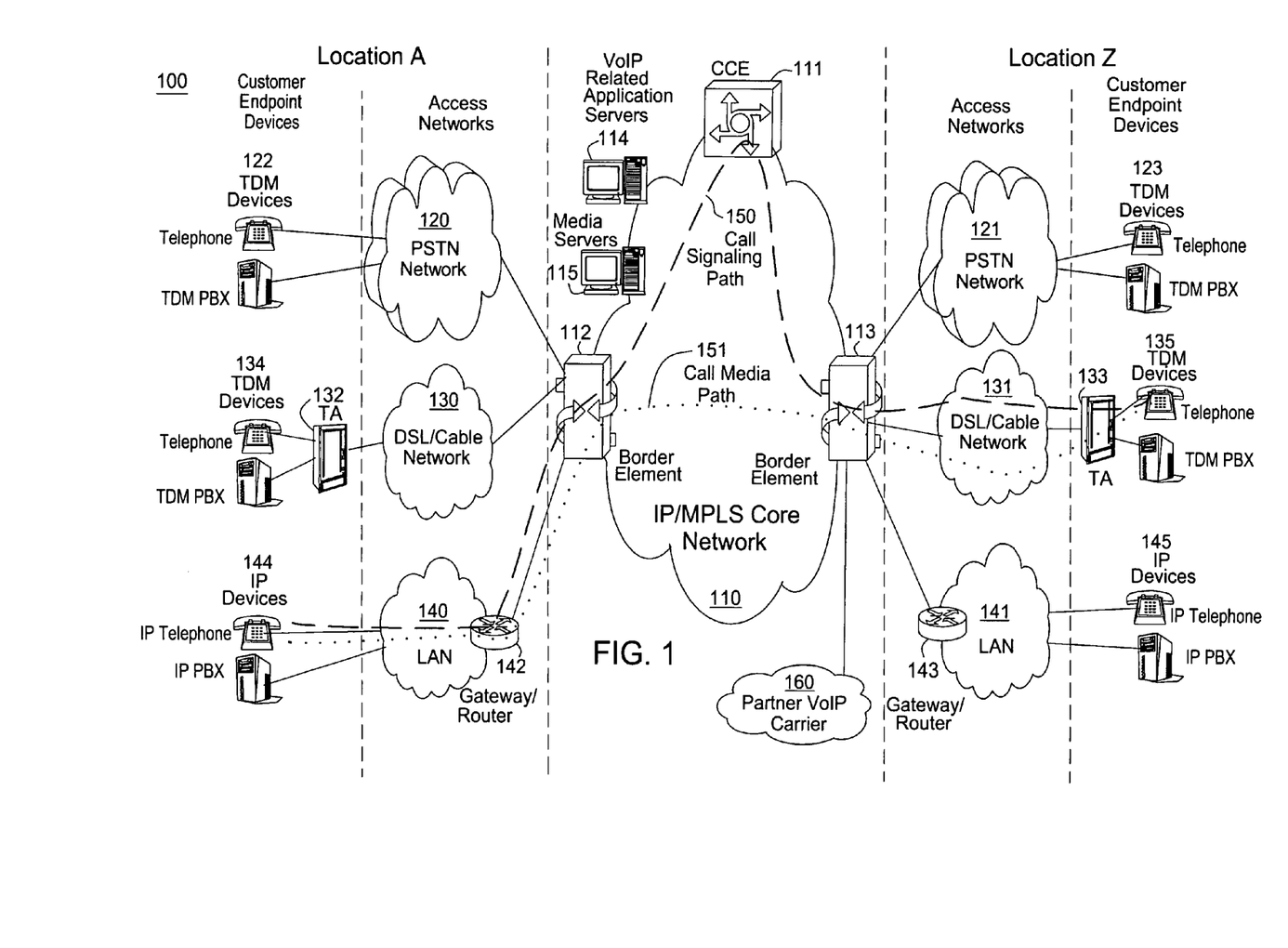
FIG. 1 illustrates an exemplary network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above VoIP network is described to provide an illustrative environment in which a large quantity of packets may traverse throughout the entire network. It would be advantageous to be able to detect anomalous events in real time relative to historical pattern and current overall event count pattern. In order to so, it would be advantageous to first determine the statistical significance of the historical data to current observations. In one embodiment, the present anomaly detection method as discussed below can be implemented in an application server of the IP network.

In one embodiment, the present method for determining anomalous counts, e.g., an anomalous condition, in streaming cross-classified event count data compares the number of observed events in a specified time interval for a particular set of categories for one or more classification variables with the expected number of events for that same time interval and same set of categories. The expected number of events is determined from the statistical summary of previously gathered data and adjustments of the data to current margins. The use of the word margin refers to aggregate number of observed events, where the aggregation is across all possible mutually exclusive categories for one or more of the classification variables. For example, if the number of observed events is the same as the number of observed events from a previous observation but the expected number of events is decreased by fifty percent, then the observed number of events is more unusual in the current observation.

In this same embodiment, in order to determine the relative importance of the variation in the observed number of events, the statistical model of the events has to be understood. For example, if the event count is known to fluctuate significantly, then the observation of a small percentage change may not be anomalous. If the event count hardly fluctuates, then the observed change may be an anomaly, and in particular, larger counts tend to fluctuate less proportionately to their size than smaller counts fluctuate. For example, if for two categories arbitrarily labeled A and B, the observed number of events for A is double the observed number of events for B, and the expected number of events for A is double the expected number of events of B, and if for category A the observed count is larger than the expected count, and likewise for B by simple algebra of proportions, then the observed count for category A is considered more unusual than the observed count for category B. The present invention makes use of the ratio labeled ratio(A)=observed(A)/expected(A) for the ratios of the two counts for category A referenced above, and makes use of the ratio (B)=observed(B)/expected(B). The two ratios are equal and greater than 1. The invention uses the technique of statistical shrinkage, to discount each ratio towards 1, so that ratio(A)>shrunk(ratio(A))>1 and ratio(B)>shrunk(ratio (B))>1. However, whereas ratio(A)=ratio(B), also expected (A)>expected(B), and thus shrunk(ratio(A))>shrunk(ratio (B)). Then, comparing the two shrunk ratios, the technique flags category A as more unusual than category B.

In one embodiment, the present invention makes uses of a statistical model for the number of events in each category of the cross-classification at each interval of time. This establishes a mathematical and statistical line of reasoning, as contrasted to an ad hoc or heuristic justification, for the selection of margins for aggregation, for the relationship of the current observation to the previous observations, for the calculation of expected values, for the formula for shrinkage, and for defining the anomalous events.

In one embodiment, the present invention uses data analysis techniques and the knowledge on the anomalous behavior of the data being collected to determine the long-term pattern of the event count, to establish the events for monitoring, to define the structure of the statistical model, to make estimates of the parameters values in the statistical model, and to determine the random variations.

In one embodiment, the long-term pattern of the event count is determined from independent data that is gathered over a period of time or is obtained in applying expert understanding to a particular problem. For example, some events are affected by day of week, season, holiday, etc. For example, in a VoIP network, call volumes may increase on holidays. If the event being observed is unsuccessful calls due to congestion, then the significance of an increase is compared to other similar holidays or to days with comparable number of observed calls, and not to the general statistics, and further, overall time trends in the event counts are considered. Therefore, the overall pattern of the event count versus time is used in defining the anomaly.

In one embodiment, the pattern of the event count for a category compared to the event counts for all categories is used in defining the anomaly. Specifically, the expected event count is updated from one time period to the next, following the statistical model, which may take into consideration seasonal variation as described in paragraph [0030]. The sum of expected event counts across a subset of categories, which may comprise all categories, is compared to the sum of observed event counts across the same subset of categories. If the sum of observed event counts is larger the sum of expected event counts, then each expected count in the subset is increased by the same factor of proportionality so that the two sums become equal. Through this means, an anomaly is defined for a specific category only when the count is anomalous relative to other counts in the subset. In practice, an algorithmic technique called iterative proportional fitting is used to match subset counts for each margin of the cross-classification simultaneously.

The events to be monitored in order to detect the anomaly are defined by taking into account and allowing for changes in the overall status. In one embodiment, the parameters of interest are determined and re-estimated after each time interval (e.g., predefined for a particular application) by combining the historical data and the current event data. For the example above of unsuccessful call events, the parameter of interest can be the total number of unsuccessful calls for a given time, the average, variance, maximum unsuccessful call count for data collected over multiple time intervals, the parameters of a statistical model, etc. The event counts and parameters of interest can be estimated after each time interval such as every 15 minutes, hour, day, etc. Adjustments for strong day of week effects, overall changes of the statistics, etc. may be included to determine the expected event count.

In order to determine the anomalous events, the random variations or noise in the event count must also be understood. The events may have very little fluctuation or significant fluctuation over time.

When the overall pattern of an event count over a period of time, the parameters of interest for the event count, and the random variations and statistical model are understood, then the appropriate initial values for the parameters of interest are determined. The data is then collected according to a preferred time interval and application. For example, the network congestion data can be collected hourly or daily. However, if the anomaly being detected is related to a virus or a network security breach, mitigation steps can be initiated immediately and subsequently, the data is then collected in the order of seconds or minutes. The requirement of a particular application determines the time interval for the data collection and anomaly detection.

The gathered data is used to calculate the expected frequencies for the current event count. The combination of data on historical event count such as the statistics with the current values gives the base expected event counts.

For example, if the data is collected daily for an IP network, the number of total received packets for the current day and the previous day are not expected to be the same. Therefore, the previous day's event count is adjusted to match the total number of packets for the current day. If the volume of traffic traversing the network is changing every day, then the base expected count is adjusted accordingly. Tracking proportional changes in surveillance and adjusting for other factors such as day of week effects are critical for understanding the significance of the event counts.

In one embodiment, the base expected event counts are determined and compared to the actual event counts. For applications where the number of parameters being observed is large, this comparison is useful to identify the data for further analysis.

For example, for pharmaceutical applications involving drug interaction studies, there may be several symptoms being observed for several drug combinations. The matrices for such study are often large and sparse. The data points where there are no interesting observations can be eliminated to reduce computational time and resources (e.g., the data points with no reported symptoms do not require more computation).

Note that the statistical model for the event count and the relationship to the previous counts have to be understood. For example, the model for each event count can be typically modeled by a Poisson distribution.

For example, Poisson distribution $$p(k, \lambda) = \frac{e^{-\lambda} \lambda^k}{k!}$$

models the probability that there are exactly k events in one unit of time. $p(k, \lambda)$ is also called the probability mass function for discrete random variables. (For continuous random variables, the analogous term is the probability density function).

In the above definition for Poisson distribution:
e=2.71828 . . . ;
k!=k*(k−1)*(k−2)* . . . 3*2*1; and
$\lambda$ is a positive real number equal to the expected (mean) number of occurrences that occur during a given time interval. For instance, if the events occur on average every 4 minutes, and one is modeling the number of events occurring in 10 minute intervals, the model would use a Poisson distribution with $\lambda$=10/4=2.5.

Both the mean and variance of the Poisson distribution are equal to $\lambda$. The correlation of the mean and variance is useful for monitoring how the fluctuations vary with the mean. The contribution of a single occurrence (event) may be estimated. Tracking proportional changes in surveillance is important but ratios have more statistical variation than allowed by the Poisson distribution for small counts. Thus, the ratios and by a following computation the base expected event counts can be smoothed using shrinkage estimations. The shrinkage estimations are determined for each parameter of interest being observed. For the example of drug interactions, the shrinkage factors are determined for each combination of drug interaction and symptom being observed. The actual expected event counts which are the Poisson cell counts with unknown mean differ from the base expected event counts by a random quantity, e.g., the shrinkage parameter for the count of the specific cell. The statistical model for the shrinkage factors can be lognormal, Gamma, etc. For example, Gamma-Poisson Shrinker (GPS), which is pre-existing art relevant to this application, uses a mixture of two Gamma distributions as described below.

For a random variable λ with a Gamma distribution, the probability density function can be given by:

$$g(\lambda, \alpha, \beta) = \lambda^{\alpha-1} \frac{\beta^\alpha e^{-\beta\lambda}}{\Gamma(\alpha)}, \lambda > 0.$$

Where, λ is the random variable;

$$\Gamma(\alpha) = \int_0^\infty x^{\alpha-1} e^{-x} dx;$$

where x is a dummy variable of integration; and
α and β are parameters that vary the shape of the distribution.
The mean of the gamma distribution is $$\frac{\alpha}{\beta}$$

and its variance is $$\frac{\alpha}{\beta^2}.$$

For example, Gamma-Poisson Shrinker (GPS) may use a mixture of two Gamma distributions as shown below:

$$\Pi(\lambda,\alpha_1,\beta_1,\alpha_2,\beta_2) = wg(\lambda,\alpha_1,\beta_1) + (1-w)g(\lambda,\alpha_2,\beta_2),$$

where, w is a number between 0 and 1 that determines the proportions of gamma distributions 1 and 2 in the weights and the variable λ in the GPS system is Poisson distributed. The Gamma-Poisson Shrinker has five parameters w, $\alpha_1$, $\beta_1$, $\alpha_2$, and $\beta_2$ making it flexible enough to fit any empirical distribution. The shrinkage factor is determined as a mixture of the previously collected data and the current data. However, the GPS technique is computationally intensive and non-updating. It may not be well suited for the problem of anomaly detection in streaming cross-classified event data. GPS provides a solution when the database of events or of event counts is analyzed and then reanalyzed only infrequently. The database can possibly be very large. For applications such as the IP network, the setting is dynamic and involves streaming data. The number of packets and events of interest are large and variable. Hence, the method for anomaly detection has to include updating capabilities and require less computation for each update. For example, if the events being monitored were the co-occurrence of a person taking pharmaceutical drugs and adverse events possibly associated with a drug, the user of a drug may have symptoms of various different adverse events, and a set of specific adverse events may be strongly associated with each particular drug. This type of study would involve classifying the data and analyzing the data using GPS. In another example, if the events are being monitored to detect a flu outbreak, the number of tests ordered, location of positive results, etc. would be tracked. The data is then cross-classified both in terms of location and symptom.

In one embodiment, the current invention uses a Kalman Filter Gamma-Poisson Shrinker (KF-GPS) as defined below in a dynamic setting. KF-GPS improves the above GPS system by using a linear combination of a gamma distributed random variable and a deterministic random variable. In one embodiment, for KF-GPS, $R_{smooth} = w\hat{R} + (1-w)*1$, where $\hat{R}$ is the ratio of a current event count to an expected cell frequency, w is a weighting function, and $R_{smooth}$ is a smooth estimate of the said ratio;

The weighting function w is $$w = \frac{\sqrt{E}}{\sqrt{E} + \alpha_t},$$

where E is the expected cell frequency and $\alpha_t$ is the shrinkage parameter. The shrinkage parameter varies the weighting function between 0 and 1. If $\alpha_t$ approaches 0, there is no shrinkage $R_{smooth} = \hat{R}$, if $\alpha_t$ is large, $R_{smooth}$ approached the deterministic random variable 1; and These quantities are obtained according to commonly-accepted statistical reasoning where the current event count follows a Poisson distribution with mean equal to the product of E and λ, where the variable λ is a shrinkage factor, and λ follows a Gamma distribution with mean 1 and variance=1.

In one embodiment, KF-GPS enables the user to detect anomalies in a dynamic setting with streaming data and event count by maintaining the statistical history of previous observations and utilizing a one or two parameter family of Gamma functions for massive scaling. The technique provides a mechanism for summarizing the history and aggregates the data over a period of time while simplifying the computation.

In one embodiment, the shrinkage factors follow a one or two parameter family of Gamma functions and require less computation than the five parameter mixture of two Gamma functions described for GPS. The 1-parameter Gamma-Poisson Shrinkage (GPS) model follows a gamma distribution with one parameter with $\alpha = \beta = \alpha_t \sqrt{E}$. This gamma distribution has a mean of 1 and a variance of $$\frac{1}{\alpha_t \sqrt{E}}.$$

The 2-parameter Gamma-Poisson Shrinkage (GPS) model is comprised of a linear combination of a gamma distribution with one-parameter and statistical distribution:

$$\prod \left(P, \beta = \alpha = \frac{1}{\alpha_t \sqrt{E}}\right) = (1-P)g\left(\beta = \alpha = \frac{1}{\alpha_t \sqrt{E}}\right) + P*1.$$

The 1- and 2-parameter GPS systems are used along with the posterior distribution of the means for the previous data that are maintained and updated to confirm to the margins of the current data.

In one embodiment, the shrinkage factors are then applied to each ratio of observed to expected event counts to smooth the ratios, and therefore to smooth the expected event counts, and thus to determine more reliable estimated event count data. The results are then compared to the current observations. Anomaly detection is achieved by comparison of quantities derived from individual event counts, for example, shrinkage parameters, to a threshold. In one embodiment, the present invention determines the difference between the posterior means of the shrinkage factor and its standard deviation to identify anomalous events.

The statistical distribution and the event counts are then updated to include the data from the latest observation. For example, the posterior means for all event counts, estimates of the parameters for the shrinkage factors, estimates of the shrinkage factor, mixture parameters for combining current and base expected event counts are calculated.

In one embodiment, the present method retains the statistical summary of the previous data, updates the data to confirm to the margins of the newly gathered data, determines the expected observations for the current data, compares the estimates with the actual observations, applies the shrinkage factors, compares the observations and the actual numbers after the shrinkage factors are applied and identifies the events that are anomalous. The method then incorporates the new data to update the statistics.

Figure 2:
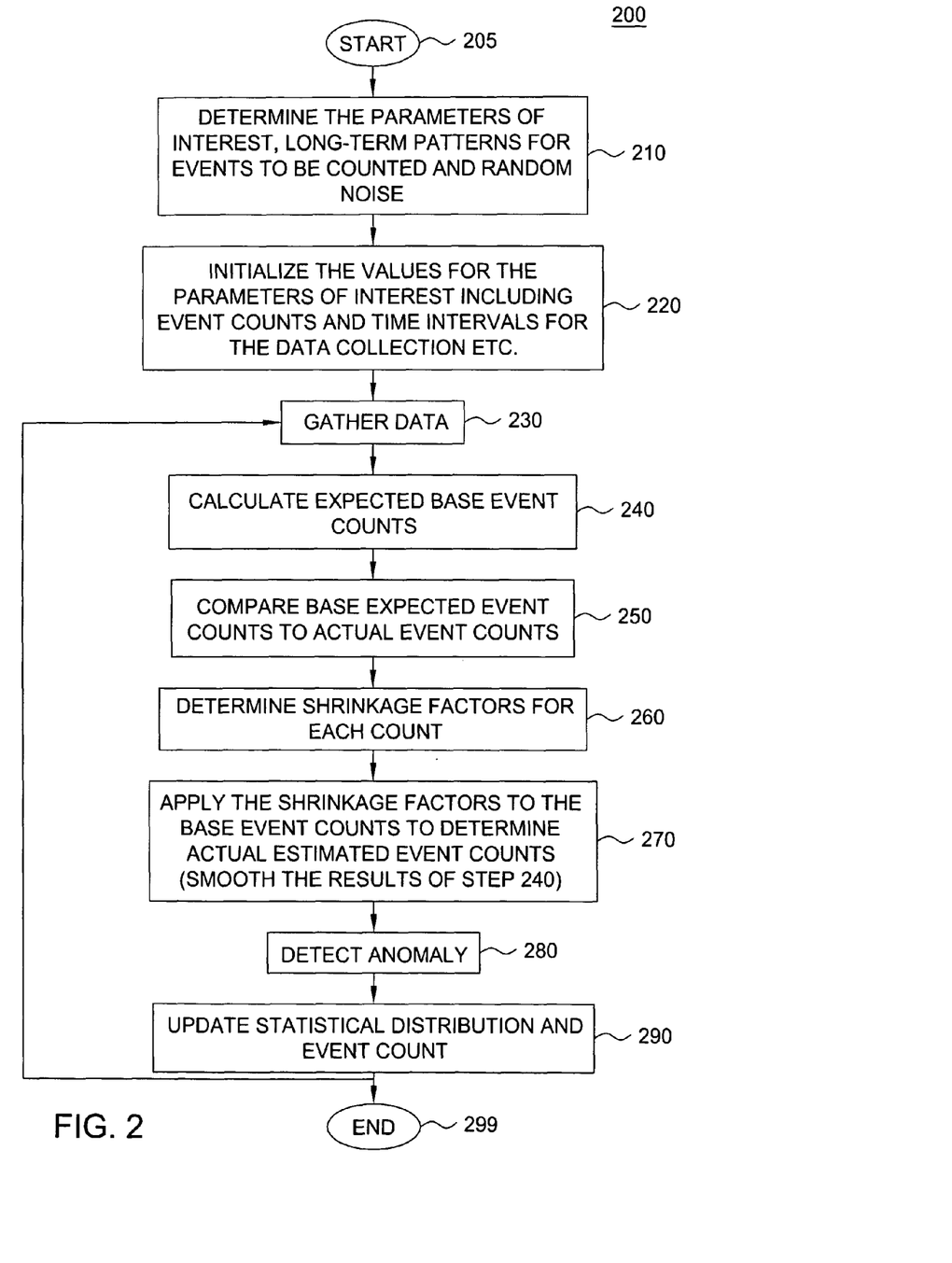
FIG. 2 illustrates a flowchart of a method for real-time anomaly detection in cross-classified streaming event count data.

FIG. 2 illustrates a flowchart of an illustrative method 200 for real-time anomaly detection in cross-classified streaming event count data. Method 200 starts in step 205 and proceeds to step 210.

In step 210, method 200 determines the parameter(s) of interest for monitoring, the long-term patterns of the events, and the random noise or variations for a particular application. For example, the parameter(s) of interest for monitoring and the long-term pattern are determined from independent data gathered over a period of time or is obtained by applying expert understanding to a particular problem. For example, in the context of congestion within an IP network, an event that is being observed can be the event of an unsuccessful call. Another observed event can be a source node or a source address that is generating a large number of call setup requests in a short period of time and so on. The significance of an increase or decrease is determined by comparing to other observations. Some events are affected by day of week, season, holiday, etc. In an IP network, call volumes may increase on holidays and comparisons are made with statistics for similar holidays and not just any day. Therefore, the overall pattern of the event count versus time is used in defining the anomaly.

In order to determine the anomalous events, the random variations or noise in the event count must also be understood. The events may have very little fluctuation or significant fluctuation over time.

When the overall pattern of the event count over time, the parameters of interest for event count, the random variations and statistical model are established, the method 200 then proceeds to step 220.

In step 220, method 200 determines the initial values for the parameter(s) of interest including the event count, data collection intervals etc. If data collection has not started, then the initial values can be determined using either empirical data or expert knowledge.

In step 230, method 200 gathers the data according to the preferred time interval and application. For example, the network congestion data can be collected hourly, daily and so on. The requirement of a particular application determines the time interval for the data collection and anomaly detection. For example, in pharmaceutical studies involving reported adverse reactions, data may be collected in weeks, months and so on.

In step 240, the gathered data is used to calculate the expected base frequencies for the event count. The combination of data on historical event count such as the statistics with the current values gives the base expected event counts. Thus, the proportional changes in surveillance are tracked and the event count for the previous observation window is adjusted to match the total number of observations of the current window.

For example, if the data is collected daily for the VoIP network, the number of total received packets for the current day and the previous day are not expected to be the same. Therefore, the previous day's event count is adjusted to match the total number of packets for the current day. If the volume of traffic traversing the network is changing every day, the base expected count is adjusted accordingly.

In step 250, the base expected event counts are compared to the actual event counts. This step reduces the number of data points requiring further analysis in cases where the matrix of data is sparse.

Note that the statistical model for the event count and the relationship to the previous counts have to be understood. For example, the model for each event count is typically modeled using a Poisson distribution. Tracking proportional changes in surveillance is important but ratios have more statistical variation than allowed by Poisson distribution for small counts. Thus, if the difference between the base expected event counts and the actual event counts indicates a potential anomalous situation, i.e., further analysis is necessary, then the base expected event counts are smoothed using shrinkage estimations.

In step 260, method 200 uses the KF-GPS method to determine the shrinkage estimates for each count being observed. The shrinkage factors may follow a one or two parameter family of Gamma functions and require less computation than the GPS methods.

In step 270, the shrinkage factors are applied to determine the actual estimated event count data by smoothing the results of step 240.

In step 280, the actual estimated event count data are compared to the current observations for anomaly detection. The requirements of a particular application will determine the parameters or thresholds for proper comparisons. For example, the anomaly can be detected by comparison of quantities derived from individual event count such as shrinkage parameters, to a threshold. In one embodiment, the present invention determines the difference between the posterior means of the shrinkage factor and its standard deviation to identify anomalous events.

In step 290, the statistical distribution and the event counts are updated to include the data from the latest observation. For example, the posterior means for all event counts, estimates of the parameters for the shrinkage factors, estimates of the shrinkage factor, mixture parameters for combining current and base expected event counts are calculated. The method then proceeds to step 299 to end the process for the current time window or to step 230 to gather data for the next time window.

In brief, the present invention provides a method for retaining the statistical summary of the previous data, updating the data to confirm to the margins of the newly gathered data, determining the expected observations for the current data, comparing the estimates with the actual observations, applying the shrinkage factors, comparing the observations and the actual numbers after the shrinkage factors are applied and identifying the events that are anomalous. The method then incorporates the new data to update the statistics so it can be used for the next observation time window.

KF-GPS as described above, enables the user to detect anomalies in a dynamic setting with streaming data and event count by maintaining the statistical history of previous observations and utilizing a one or two parameter family of Gamma functions. The present method provides a mechanism for summarizing the history of a dynamic data while simplifying the computation.

Figure 3:
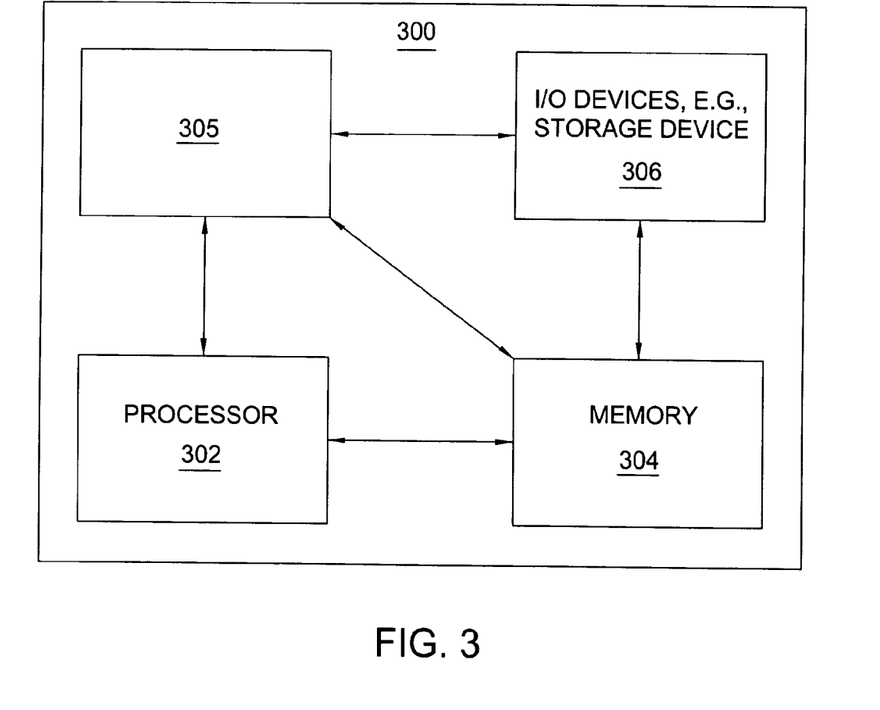
FIG. 3 illustrates a high level block diagram of a general purpose computer suitable for use in performing the functions described herein.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for real-time anomaly detection in cross-classified streaming event count data, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 305 for real-time anomaly detection in cross-classified streaming event count data can be loaded into memory 304 and executed by processor 302 to implement the functions as discussed above. As such, the present method 305 for real-time anomaly detection in cross-classified streaming event count data (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting an anomalous condition in a data stream, comprising:
   calculating, by a processor, an expected base event count for an event in the data stream for a time interval, wherein the data stream represents data with cross-classified events, wherein each cross-classified event is an event having at least two categories;
   obtaining, by the processor, an actual event count for the event in the data stream for the time interval;
   applying, by the processor, a shrinkage factor to a ratio of the actual event count and the expected base event count to obtain an actual estimated event count, wherein the shrinkage factor uses an N parameter family of functions that comprises a family of gamma functions, where N is an integer not greater than two, wherein the shrinkage factor is obtained using a kalman filter gamma-poisson shrinker; and
   detecting, by the processor, the anomalous condition in accordance with the actual event count and the actual estimated event count.

2. The method of claim 1, wherein the data stream represents packets in a communication network.

3. The method of claim 1, wherein the data stream represents medical records.

4. The method of claim 1, wherein the data stream represents financial records.

5. The method of claim 1, wherein the data stream represents chemical reaction records.

6. A non-transitory computer-readable medium to store a plurality of instructions which, when executed by a processor, cause the processor to perform operations for detecting an anomalous condition in a data stream, the operations comprising:
   calculating an expected base event count for an event in the data stream for a time interval, wherein the data stream represents data with cross-classified events, wherein each cross-classified event is an event having at least two categories;
   obtaining an actual event count for the event in the data stream for the time interval;
   applying a shrinkage factor to a ratio of the actual event count and the expected base event count to obtain an actual estimated event count, wherein the shrinkage factor uses an N parameter family of functions that comprises a family of gamma functions, where N is an integer not greater than two, wherein the shrinkage factor is obtained using a kalman filter gamma-poisson shrinker; and
   detecting the anomalous condition in accordance with the actual event count and the actual estimated event count.

7. The non-transitory computer-readable medium of claim 6, wherein the data stream represents packets in a communication network.

8. The non-transitory computer-readable medium of claim 6, wherein the data stream represents medical records.

9. The non-transitory computer-readable medium of claim 6, wherein the data stream represents financial records.

10. The non-transitory computer-readable medium of claim 6, wherein the data stream represents chemical reaction records.

11. An apparatus for detecting an anomalous condition in a data stream comprising:
   a processor; and
   a computer-readable medium in communication with the processor, to store a plurality of instructions which, when executed by the processor, cause the processor to perform operations, the operations comprising:
      calculating an expected base event count for an event in the data stream for a time interval, wherein the data stream represents data with cross-classified events, wherein each cross-classified event is an event having at least two categories;
      obtaining an actual event count for the event in the data stream for the time interval;
      applying a shrinkage factor to a ratio of the actual event count and the expected base event count to obtain an actual estimated event count, wherein the shrinkage factor uses an N parameter family of functions that comprises a family of gamma functions, where N is an integer not greater than two, wherein the shrinkage factor is obtained using a kalman filter gamma-poisson shrinker; and detecting the anomalous condition in accordance with the actual event count and the actual estimated event count.

\* \* \* \* \*